(12) United States Patent
Chitalia et al.

(10) Patent No.: US 12,481,980 B2
(45) Date of Patent: Nov. 25, 2025

(54) SECURE REMOTE TRANSACTION FRAMEWORK USING DYNAMIC SECURE CHECKOUT ELEMENT

(71) Applicant: Visa International Service Association, San Francisco, CA (US)

(72) Inventors: Jalpesh Chitalia, Castro Valley, CA (US); Ansar Ansari, San Ramon, CA (US); Kevin Carvalho, Sunnyvale, CA (US); Thomas Purves, San Francisco, CA (US); Manoj Kannembath, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 307 days.

(21) Appl. No.: 16/448,777

(22) Filed: Jun. 21, 2019

(65) Prior Publication Data

US 2019/0392431 A1 Dec. 26, 2019

Related U.S. Application Data

(60) Provisional application No. 62/688,863, filed on Jun. 22, 2018.

(51) Int. Cl.
*G06Q 20/36* (2012.01)
*G06Q 20/32* (2012.01)
(Continued)

(52) U.S. Cl.
CPC ..... *G06Q 20/3674* (2013.01); *G06Q 20/3227* (2013.01); *G06Q 20/3821* (2013.01); *G06Q 20/4014* (2013.01)

(58) Field of Classification Search
CPC ........... G06Q 20/3674; G06Q 20/3227; G06Q 20/3821; G06Q 20/4014
(Continued)

(56) References Cited

U.S. PATENT DOCUMENTS 5,280,527 A 1/1994 Gullman
5,613,012 A 3/1997 Hoffman
(Continued)

FOREIGN PATENT DOCUMENTS

CN 103685204 A 3/2014
CN 105531733 A 4/2016
(Continued)

OTHER PUBLICATIONS

PCT/US2019/038503, "International Search Report and Written Opinion", Oct. 16, 2019, 12 pages.
(Continued)

*Primary Examiner* — Neha Patel
*Assistant Examiner* — Yin Y Choi
(74) *Attorney, Agent, or Firm* — Kilpatrick Townsend & Stockton LLP

(57) ABSTRACT

Embodiments of the invention are directed to systems and methods of providing secure remote transaction (SRT) transactions. In some embodiments, a resource provider is able to embed a checkout element into a webpage that it hosts. The checkout element enables interaction between a user that has accessed the webpage and an initiator application server located remotely in order to complete a transaction while preventing the resource provider from gaining access to sensitive information. In some embodiments, the user's information may be determined by an initiator server and populated into the checkout element.

10 Claims, 8 Drawing Sheets

(51) Int. Cl.
*G06Q 20/38* (2012.01)
*G06Q 20/40* (2012.01)

(58) Field of Classification Search
USPC .......................................................... 705/67
See application file for complete search history.

(56) References Cited

U.S. PATENT DOCUMENTS

| | | | |
|---|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,121,957 B1 * | 2/2012 | Nowka |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,433,116 B2 | 4/2013 | Butler et al. |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |

(56) References Cited

U.S. PATENT DOCUMENTS

| | | |
|---|---|---|
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,631,231 B2 | 1/2014 | Wentker et al. |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 9,754,245 B1 | 9/2017 | Davison et al. |
| 9,799,029 B2 | 10/2017 | Neuwirth |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder |
| 2008/0302869 A1 | 12/2008 | Mullen |
| 2008/0302876 A1 | 12/2008 | Mullen |
| 2008/0313264 A1 | 12/2008 | Pestoni |
| 2008/0319896 A1 | 12/2008 | Carlson et al. |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0036945 A1* | 2/2010 | Allibhoy .......... G06Q 20/0855 709/224 |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |

(56) References Cited

U.S. PATENT DOCUMENTS

| | | |
|---|---|---|
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |

(56) References Cited

U.S. PATENT DOCUMENTS

| | | |
|---|---|---|
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019298 A1* | 1/2014 | Suchet et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0143151 A1* | 5/2014 | Dhar |
| 2014/0164243 A1 | 6/2014 | Aabye et al. |
| 2014/0164254 A1* | 6/2014 | Dimmick |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2014/0379578 A1 | 12/2014 | Chan et al. |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232518 A1* | 8/2016 | Butler |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0180343 A1* | 6/2017 | de Ganon et al. |
| 2017/0186001 A1 | 6/2017 | Reed et al. |
| 2017/0200156 A1 | 7/2017 | Karpenko |
| 2017/0200165 A1* | 7/2017 | Laxminarayanan .. H04L 9/3297 |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0236113 A1 | 8/2017 | Chitalia |
| 2017/0262832 A1* | 9/2017 | Deshpande et al. |
| 2017/0278084 A1* | 9/2017 | Kumra et al. |
| 2017/0278174 A1 | 9/2017 | Harrell |
| 2017/0293914 A1 | 10/2017 | Girish |
| 2017/0295155 A1 | 10/2017 | Wong et al. |
| 2017/0357965 A1* | 12/2017 | Knopp |
| 2017/0357976 A1* | 12/2017 | Malik et al. |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0276660 A1 | 9/2018 | Ansari et al. |
| 2018/0285875 A1 | 10/2018 | Law |
| 2018/0324184 A1 | 11/2018 | Kaja |
| 2018/0324584 A1 | 11/2018 | Lopez |
| 2019/0019185 A1 | 1/2019 | Chitalia et al. |
| 2019/0020478 A1 | 1/2019 | Girish |
| 2019/0066069 A1 | 2/2019 | Faith |

(56) References Cited

U.S. PATENT DOCUMENTS

2019/0122215 A1* 4/2019 Trivedi et al.
2019/0147439 A1    5/2019 Wang
2020/0005346 A1* 1/2020 Georgoff ............ G06Q 30/0211
2020/0273032 A1* 8/2020 Narayan ............ G06Q 20/3821

FOREIGN PATENT DOCUMENTS

| | | |
|---|---|---|
| EP | 1028401 A2 | 8/2000 |
| EP | 2156397 A1 | 2/2010 |
| WO | 2000/014648 A1 | 3/2000 |
| WO | 2001035304 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2017181185 | 10/2017 |
| WO | 2019014374 | 1/2019 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Dean, et al., U.S. Appl. No. 16/311,144 (unpublished), "Encryption Key Exhange Process Using Access Device," filed Dec. 18, 2018.
Kang, et al., U.S. Appl. No. 16/347,175 (unpublished), "Access Identifier Provisioning to Application," filed May 2, 2019.
Palanisamy, et al., U.S. Appl. No. 16/415,360 (unpublished), "Method and System for Access Token Processing," filed May 17, 2019.
Application No. EP19823700.0, Extended European Search Report, Mailed on Jul. 28, 2021, 10 pages.
Application No. CN201980041693.X , Office Action, Mailed on Sep. 28, 2023, 16 pages.
Application No. EP19823700.0, Office Action, Mailed on Jan. 17, 2024, 5 pages.
Application No. SG11202012068W, Notice of Decision to Grant, Mailed on Feb. 27, 2024, 4 pages.
AU2019290223 , "First Examination Report", Apr. 10, 2024, 4 pages.
AU2019290223 , "Third Examination Report", Nov. 7, 2024, 7 pages.
AU2019290223 , "Fourth Examination Report", Mar. 19, 2025, 4 pages.
AU2019290223 , "Second Examination Report", Aug. 6, 2024, 4 pages.
Singapore Application No. 11202012068W, Written Opinion dated Oct. 26, 2022, 10 pages.

* cited by examiner

700

702 704 706

708

SECURE REMOTE TRANSACTION FRAMEWORK USING DYNAMIC SECURE CHECKOUT ELEMENT

This application claims priority to U.S. Patent Application No. 62/688,863, filed on Jun. 22, 2018, the disclosure of which is herein incorporated by reference in its entirety.

BACKGROUND

Because conducting transactions over electronic networks such as the Internet has a number of advantages that include convenience and lower costs, electronic commerce has recently experienced a large amount of growth. However, the anonymity of the Internet increases the issues of fraud and misuse to an electronic retailer. An electronic resource provider has a desire to authenticate a transaction in order to reduce the risk of loss stemming from fraud. Similarly, a consumer has a desire to increase convenience by enabling the use of more channels. Additionally, a consumer often has a desire to remain anonymous, as exposure of personal information may often put the consumer at increased risk.

In order to complete a transaction, a user is often asked to provide a number of personal details to a merchant. This is problematic if the user wishes to remain anonymous, or if the merchant is not a trusted entity. Some conventional remote transaction systems have been developed that require a user be redirected to another entity to complete the transaction. For example, upon selecting a checkout element, a user may be presented with a popup window which includes his or her personal details. This at least prevents the merchant from gaining access to the user's information, but can also reduce the efficiency of the transaction.

Furthermore, transactions conducted using access credentials may put those access credentials at risk. For example, a merchant that obtains access credentials from a user during a transaction may sell or use those access credentials to conduct an unauthorized transaction. The use of a token, and more particularly a limited-use token, instead of access credentials may be more secure than the use of access credentials to complete the transaction.

Embodiments of the present invention address these problems and other problems, individually and collectively.

SUMMARY

Described herein are a system and techniques for providing secure remote transaction (SRT) transactions. In some embodiments, a resource provider may embed a checkout element into a website hosted by that resource provider. The checkout element may include an indication as to a type and format of information to be presented within the checkout element. Upon the website being loaded via a browser application, the checkout element may be caused to communicate with an initiator application server in order to be populated in accordance with the indicated information type and format without that information being made available to a resource provider.

One embodiment of the disclosure is directed to a method comprising presenting a resource document associated with at least one resource managed by a resource provider, upon receiving a request to complete a transaction for the at least one resource, instantiating a checkout element in association with the resource document, identifying, via the checkout element, information indicating an identity of a user of the client device, transmitting the information indicating the identity of the user to a remote server, receiving, from the remote server, a token to be used to complete the transaction, and providing, via the checkout element to the resource provider, the token.

Another embodiment of the disclosure is directed to A client device comprising: a processor; and a memory including instructions that, when executed with the processor, cause the client device to, at least: present a resource document associated with at least one resource managed by a resource provider, upon receiving a request to complete a transaction for the at least one resource, instantiate a checkout element in association with the resource document, identify, via the checkout element, information indicating an identity of a user of the client device, transmit the information indicating the identity of the user to a remote server, receive, from the remote server, a token to be used to complete the transaction, and provide, via the checkout element to the resource provider, the token.

Further details regarding embodiments of the disclosure can be found in the Detailed Description and the Figures.

DETAILED DESCRIPTION

Figure 1:
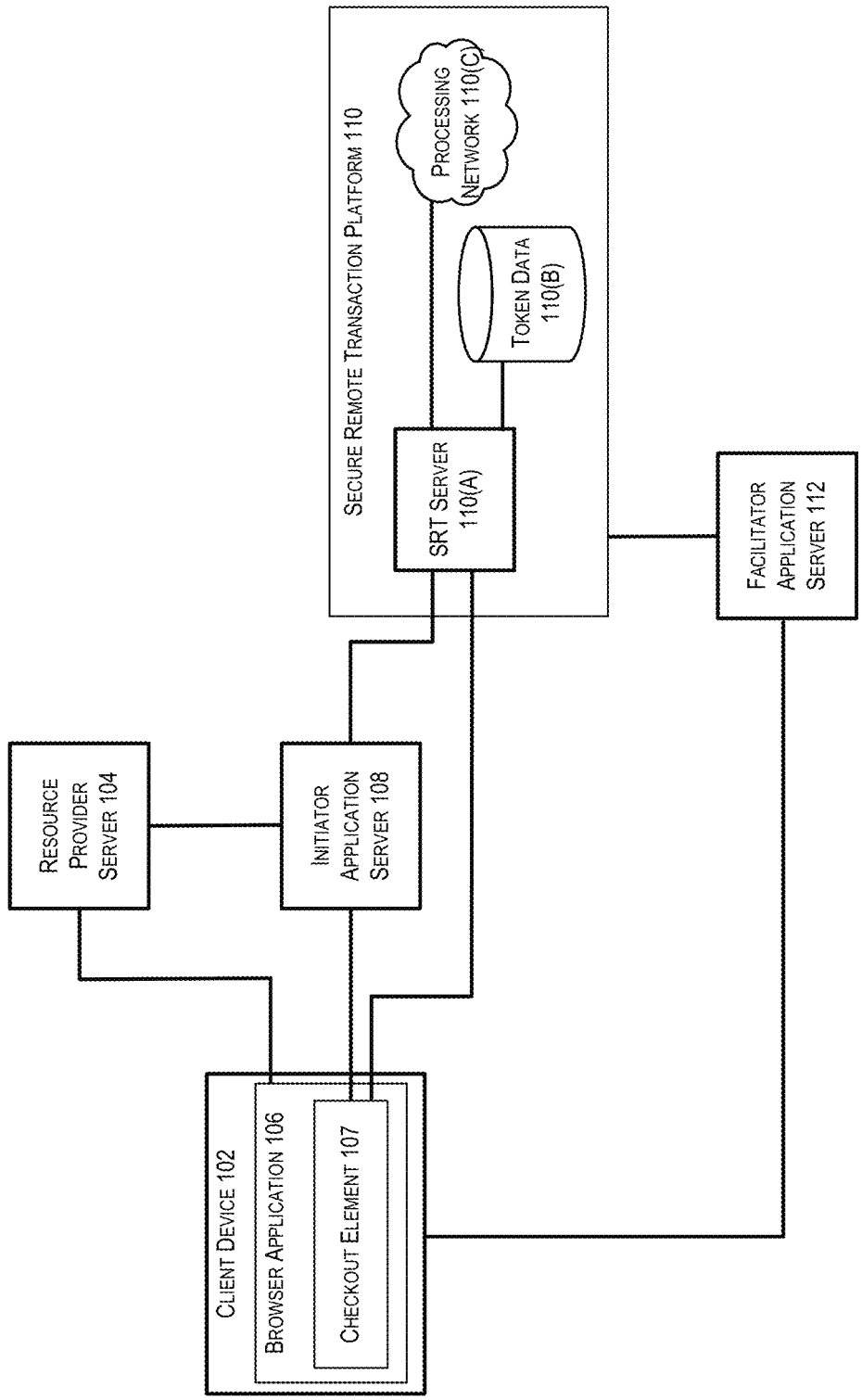
FIG. 1 depicts a number of components that may be involved in a system used to implement at least some embodiments of the disclosure.

Embodiments of the disclosure are directed to techniques for securely conducting electronic commerce (e-commerce) transactions. In particular, the disclosure seeks to enable users to conduct transactions with entities with whom they do not have a relationship while preventing those entities from obtaining sensitive information related to the user.

In embodiments of the disclosure, upon loading a website that includes a separate application (e.g., a checkout element) on a client device, the client computing device may be caused to initiate communication with a remote initiator server. The initiator server may receive a number of transaction details from the client computing device, as well as user-identifying information. In some embodiments, the initiator server may derive various information from cookies placed upon the client computing device.

In some embodiments, the initiator server, upon receiving this information, may identify a user identity associated with the transaction. Once the user identity has been identified, the initiator server may determine a number of accounts associated with that user identity. A list of these accounts may be provided to the client computing device to be presented to the user within the separate application. Upon selection of one of the accounts, the initiator server may communicate the selection to a secure remote transaction (SRT) platform associated with that account.

The SRT platform may then (upon authentication) generate a token specific to the transaction, which may then be provided to the initiator application and subsequently to the resource provider in order to complete the transaction. This may be done without exposing any sensitive information to the host of the website in which the checkout element is embedded.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

"Account credentials" may include any suitable information associated with an account (e.g. an account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

An "acquirer" may typically be a business entity (e.g., a commercial bank) that has a business relationship with a particular resource provider or other entity. Some entities can perform both issuer and acquirer functions. Some embodiments may encompass such single entity issuer-acquirers. An acquirer may operate an acquirer computer, which can also be generically referred to as a "transport computer."

An "authentication indicator" may be any suitable piece of data that provides additional proof that a particular circumstance is authentic. Exemplary authentication indictors may include cryptograms, flags, or other data which can indicate that a user was authenticated by a computing device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user.

A "checkout element" may be any mechanism for initiating a transaction. For example, a checkout element may comprise a button on a graphical user interface that, when selected, causes a transaction to be initiated.

A "computing device" may include any suitable device that can electronically process data. Examples of computing devices include desktop computers, mobile devices or mobile computing devices, television sets, etc.

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver.

A "facilitator" may be any entity capable of authenticating a user of a client device. A facilitator may include a client-side application (e.g., a facilitator application) as well as a backend server (e.g., a facilitator server) capable of supporting the client-side application. In some cases, a facilitator application may be executed upon receiving instructions from a facilitator server to authenticate a user of the client device. The facilitator application may cause the client device upon which it is installed to obtain user-specific data. This user-specific data may then be compared to expected user-specific data, either by the facilitator application on the client device or by the facilitator server, to determine whether the obtained user-specific data matches the expected user-specific data. In some embodiments, a facilitator may be an electronic wallet provider (e.g., Apple Pay). It should be noted that the facilitator may be unaffiliated with the SRT Platform and/or the initiator.

An "initiator" may be any entity capable of facilitating communication between a resource provider and one or more SRT platforms. An initiator may operate a number of servers which provide at least a portion of the functionality described herein. In some cases, an initiator may obtain approval and/or accreditation from one or more SRT platforms in order to operate in conjunction with those SRT platforms. A resource provider may enroll with the initiator in order to obtain access to at least a portion of the processes described herein. An initiator may provide each resource provider that enrolls with it a link to embed within a checkout element. The link, when activated by a user wishing to transact with the resource provider, may initiate the processes described herein in order to facilitate a transaction between the user and the resource provider. It should be noted that the initiator may be unaffiliated with the SRT Platform and/or the facilitator.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction) .Some non-limiting examples of a resource may be a good or service, a physical building, a computer account or file, or a payment account. In some embodiments, a resource may refer to a financial product, such as a loan or line of credit.

A "resource document" may be any document pertaining to a resource. In some embodiments, a resource document may be a webpage document related to a particular product. The webpage may be hosted by a resource provider and in some embodiments may include a checkout element.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "secure remote transaction (SRT) platform" may be any entity capable of facilitating a transaction in the manners described. A SRT platform may be capable of communicating with an initiator, a facilitator, and a transaction processing network. In some embodiments, a SRT platform may include a SRT server, a token provider, and a transaction processing network. An SRT platform may be configured to perform one or more processes that include: receive a request for a transaction from an initiator, identify an account associated with the transaction, determine an appropriate facilitator for the account, cause the determined facilitator to authenticate a user associated with the account, generate a token to be used in the transaction, and provide the token to the initiator to complete the transaction.

A "token" may be a substitute value for a credential. A token may be a string of numbers, letters, or any other suitable characters. Examples of tokens include tokens, access tokens, personal identification tokens, etc. A token may include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, an account identifier (e.g., a primary account number (PAN)) may be tokenized by replacing the primary account identifier with a substitute number (e.g. a token) that may be associated with the account identifier. Further, tokenization may be applied to any other information that may be replaced with a substitute value. Tokenization may be used to enhance transaction efficiency, improve transaction security, increase service transparency, or to provide a method for third-party enablement.

A "token provider" or "token service system" can include one or more computers that service tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN and conducting a transaction using that PAN. In some embodiments, a token service system may include a tokenization computer alone, or in combination with other computers such as a transaction processing network computer. Various entities of a tokenization ecosystem may assume the roles of the token provider. For example, processing networks and issuers or their agents may become the token provider by implementing the token services according to embodiments of the present invention.

A "token vault" may refer to a repository that maintains established token-to-PAN mappings. According to various embodiments, the token vault may also maintain other attributes of the token requestor that may be determined at the time of registration and that may be used by the token SRT server to apply domain restrictions or other controls during transaction processing. The token vault may be a part of the token service system. In some embodiments, the token vault may be provided as a part of the token SRT server. Alternatively, the token vault may be a remote repository accessible by the token SRT server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entities (e.g., issuers), acquirers, merchants, and payment device users.

A "user" may include an individual. In some embodiments, a user may be associated with one or more personal accounts and/or mobile devices. The user may also be referred to as a cardholder, account holder, or consumer.

FIG. 1 depicts a number of components that may be involved in a system used to implement at least some embodiments of the disclosure. In FIG. 1, a client device 102 may be in communication with a number of remote entities via a network connection (either wireless or physical). For example, the client device 102 may be used to access a website maintained by a resource provider server 104 via a browser application 106. In this example, the website may have an embedded a checkout element 107 configured to cause the client device 102 to initiate communication with a initiator server 108. The checkout element is an example of a separate application that may be embedded within a webpage. The initiator server 108 may, in turn, be in communication with a secure remote transaction (SRT) platform 110. In some embodiments, the client device 102 may have installed on it a facilitator application, which may be configured to cause the client device 102 to communicate with a facilitator application server 112.

In some embodiments of the invention, the client device 102 may be a mobile device (e.g. a mobile phone). The mobile device may be capable of communicating with cell towers (e.g., via cellular communications such as GSM, LTE, 4G) and wireless routers (e.g., via WiFi). The mobile device may store the user's account credentials, such as a PAN (primary account number), a token, a name, an address, a CVV, an expiration date, and any other suitable information. Such data may be securely stored via hardware (e.g., a secure element) or software. In some embodiments, the client device 102 may store, in its memory, a number of cookies, each of which may be store information for the client device and/or a user of the client device. In some embodiments, one or more cookies may include an indication of a payment device to be used in a transaction.

In some embodiments, the resource provider server 104 may be affiliated with an online retailer or another suitable resource provider having an electronic catalog. The resource provider server 104 may serve one or more pages of a resource provider website to a browser 106 installed on the client device 102. In some embodiments, the website served to the browser application may contain a portal or link that, when accessed using the browser application, initiates communication with the initiator server 108. In some embodiments, the website may include an application that automatically initiates contact with the initiator application server 108 and/or the SRT platform 110 upon the website being loaded into the browser application 106.

The initiator server 108 may be any suitable computing device configured to generate information to be populated into a checkout element embedded in a checkout website operated by, or on behalf of, the resource provider server 104. In some embodiments, the initiator server 108 may receive information from the resource provider server 104 and/or client device 102 that indicates what information should be presented in a checkout element 107 as well as a format or structure in which data should be presented. The initiator server 108 may be configured to identify a user, identify accounts for that user, and populate a checkout element within a website with the identified user information. The initiator server 108 may also be configured to receive a selection of one of those accounts from the client device 102, communicate the selected account to an SRT platform 110 associated with that account, and complete a transaction using the selected account. It should be noted that the initiator server 108 may be configured to perform each of the above functions without providing confidential information to the resource provider server 104, despite the fact that the checkout element is embedded within a webpage hosted by that resource provider server 104.

In some embodiments, there may be a number of SRT platforms 110 and the SRT platforms 110 may each be associated with a transaction processing network. Each SRT platform may include some combination of an SRT server (or servers) 110(A), token data 110(B), and a processing network 110(C). Multiple accounts may be associated with a single SRT platform. For example, a user may be associated with two different accounts which are each associated with different authentication entities, while both accounts are able to be processed using a single SRT platform. The SRT server may be configured to communicate with the initiator application server 108 to provide information to be populated into the checkout element 107. For example, the resource provider server 104 may embed a checkout element 107 into a webpage that it maintains or operates. In this example, the checkout element may indicate a style or format (e.g., "a look and feel") in which certain user details should be presented to the client device 102. The initiator application server 108 may identify the user details to be presented in the checkout element and may communicate with a number of different SRT platforms 110 to obtain the identified user details. In some embodiments, the checkout element may be a separate computing application, such as a widget.

The SRT server 110(A) (which may be an example of a secure remote server), may be configured to identify a facilitator application server 112 associated with an account and cause the user to be authenticated using that facilitator application server 112. Additionally, once the user has been authenticated, the SRT server 110(A) may be configured to generate a token to be associated with a transaction which is stored in the respective token data 110(B). The SRT server 110(A) may pass the token to the initiator server 308, which may generate transaction information that includes the token to be used for a transaction. A mapping between the token and the transaction may be maintained by the SRT server 110(A) in its respective token data. In some embodiments, the SRT server 110(A) may receive a number of files from various authorization entities, each of which may include mappings between email addresses and various PANs. In this way, the SRT server 110(A) may maintain a mapping between user identifier information and accounts.

The facilitator application server 112 may be any suitable computing device that provides support for a respective facilitator application. In some embodiments, the facilitator application server 112 may perform authentication processing on behalf of the facilitator application. For example, the facilitator application may cause the client device 102 to obtain authentication data from a user of the client device 102. Once obtained, the authentication data may be transmitted to the facilitator application server 112 that corresponds to the facilitator application used to collect the authentication data. The authentication data may then be compared to authentication data on record for that user by the facilitator application server 112.

A facilitator application may be any suitable set of computer-executable instructions installed on the client device 102 that, when executed, causes the client device 102 to perform an authentication process. In some embodiments, the authentication process may involve the collection of biometric information associated with a user of the client device 102. For example, the facilitator application may obtain voiceprint or fingerprint data to be used to authenticate the user. The facilitator application may be tied to hardware installed on the client device 102. Examples of facilitator applications may include fingerprint, retinal, or voice scanning applications. The hardware associated with those applications may include fingerprint, retinal, or voice scanning hardware such as fingerprint, retinal, or voice sensors. Other types of facilitator applications may also include PIN and password facilitator applications. In some embodiments, a facilitator application may be a wallet SRT server.

For an illustrative example of at least some embodiments of the disclosure, consider a scenario in which a user accesses a merchant (resource provider 104) website to complete a transaction (e.g., make a purchase). It should be noted in this example that the user may not have any relationship with the merchant (e.g., does not have an account and has not previously conducted a transaction with the merchant). In this scenario, the user may, upon selecting a number of items for the transaction, be served a checkout page for the merchant website. The checkout page may include a list of the items, prices, quantities, or any other suitable transaction-related information. In addition, the checkout page may include a checkout element that contains a list of accounts associated with a the user and shipping information as well as a button that may be selected to initiate a transaction. This list of accounts is able to be provided despite the fact that the user does not have a relationship with the merchant.

In the scenario above, upon loading of the website that includes the checkout element by the user of the client device 102, the client device 102 may be caused to initiate communication with the initiator server 308. This may involve the transmission of a number of transaction-related details from the client device 102 to the initiator server 106. In some embodiments, the client device 102 may also transmit user-identifying information to the initiator server 108. For example, a helper feature in the browser application may provide user identifier information (e.g., via cookies). The initiator server 108 may then identify the user associated with the transaction. If the initiator server 108 is not able to identify the user based on the user-identifying information, then the user may be asked to self-identify (e.g., login).

Once a user has been identified by the initiator server 108, the initiator server 108 may send requests to a number of different SRT platforms 110 to identify accounts associated with the identified user. In some embodiments, a user may have several accounts with a single SRT platform 110 (e.g., across multiple issuers within the same transaction processing network). The initiator server 108 may receive responses from each of the number of different SRT platforms 110 with a list of accounts associated with the user. Once received, the lists may be aggregated into a single list including each of the identified accounts.

Once an aggregated list of accounts has been created, it may be presented to the user via the client device 102 within the checkout element 107. In this scenario, the user may be presented with a number of different accounts belonging to him or her, with which the transaction can be completed. The user may then select one of the accounts from the list. Once this selection has been made, it is transmitted to the initiator server 108 and onto the SRT platform 110 associated with the selected account. It should be noted that the browser application 106 may be configured so that even though the current website being viewed (and the checkout element 107 embedded therein) is hosted by a merchant, that merchant has no visibility into the user information (e.g., the list of accounts) presented within the checkout element 107.

Upon receiving a selection of an account to be used, the initiator application server 108 may initiate a transaction using the selected account. For example, the initiator application server 108 may cause the SRT platform 110 to generate a token to be associated with the requested transaction. The token may be mapped to the selected account via the token data 110(B). Once a token has been assigned to the transaction, the SRT platform 110 may provide the token to the initiator server 108. The initiator server 108 may generate transaction information to be provided to the resource provider that includes the token. The resource provider (e.g., the merchant) may subsequently use the received token to complete the requested transaction.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
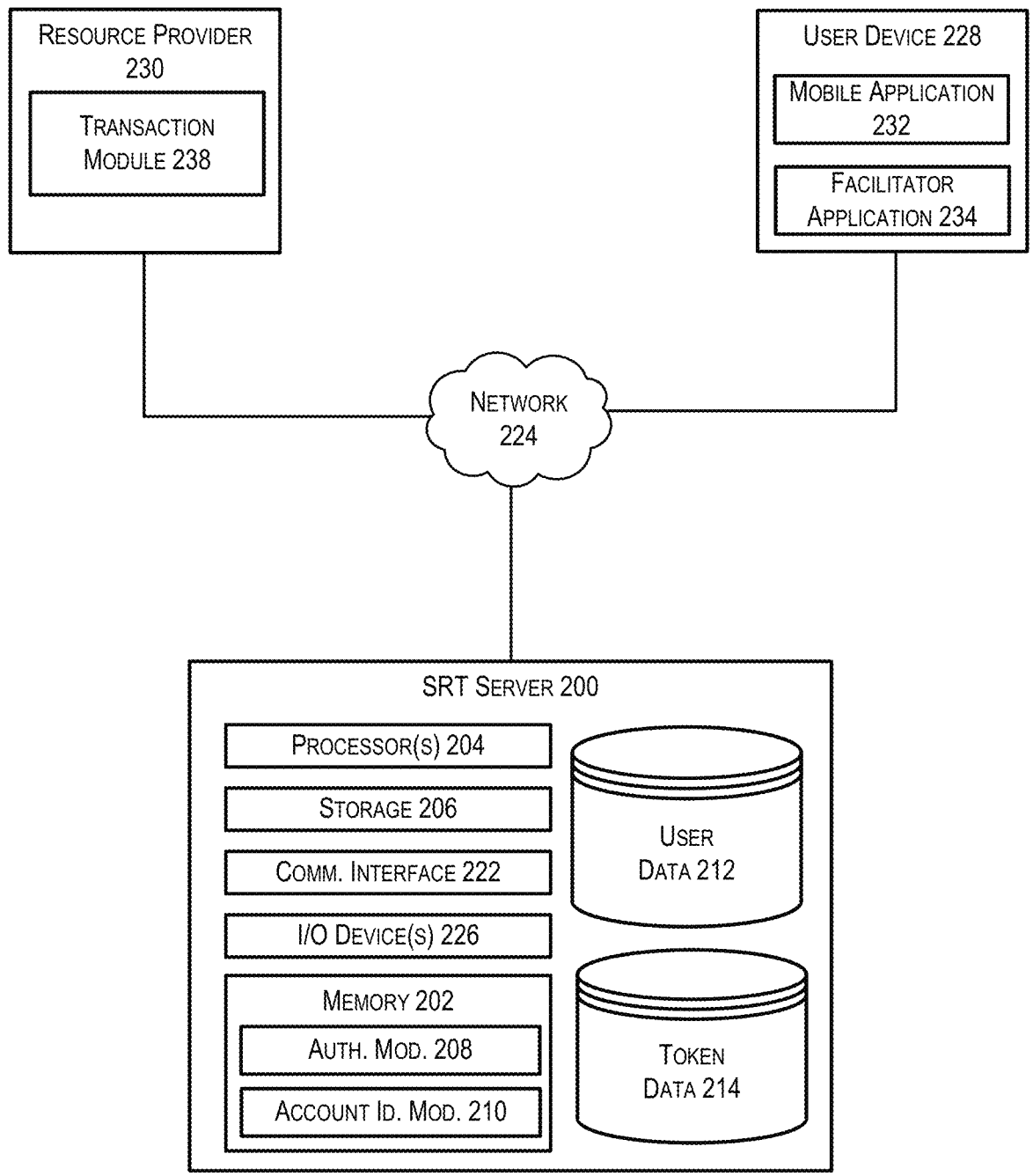
FIG. 2 depicts a diagram of an exemplary secure remote transaction (SRT) server that may be configured to conduct secure transaction processing in accordance with at least some embodiments.

FIG. 2 depicts a diagram of an exemplary SRT server 200 that may be configured to conduct secure transaction processing in accordance with at least some embodiments. The SRT server 200 may be an example of the SRT server 110 described with respect to FIG. 1 above.

The SRT server 200 may be any type of computing device capable of receiving data from a checkout element and providing/processing a token to be used in completing a transaction. In at least some embodiments, the SRT server 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of SRT server 200, the memory 202 may be volatile (such as random access memory (RAM)) and/or non-volatile (such as read-only memory (ROM), flash memory, etc.). The SRT server 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the SRT server 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for determining whether to approve or decline a transaction (authorization module 208) and a module for identifying user accounts based on provided data (account identification module 210). The memory 202 may also include a number of data stores, including user data 212, which maintains information associated with individual users, and/or token data 214, which may maintain information on tokens associated with particular users and/or transactions. In some embodiments, the SRT server 200 may maintain one or more accounts associated with a user.

In some embodiments, the authorization module 208 may, in conjunction with the processor 204, be configured to determine whether to authorize a transaction related to an authorization request message. In some embodiments, the authorization module 208 may receive an authorization request message that includes a token. In some embodiments, the token may be formatted such that the authorization request message is routed to the SRT server 200. For example, the token may include a six-digit banking identification number (BIN) associated with the SRT server 200 that causes a transaction processing network to route any authorization request message that includes the token to the SRT server 200. Upon receiving the authorization request message that includes the token, the authorization module 208 may identify an account associated with the token (e.g., via token data 214) and retrieve data associated with that account from user data 212. In some embodiments, the authorization module 208 may then determine whether to approve or decline the transaction based on information included in the authorization request message as well as data associated with the user. In some embodiments, the authorization module 208 may identify a payment account to be used to complete the transaction and may generate a new authorization request message that includes an identifier for that payment account, which the authorization module 208 may subsequently route to an authorization entity for that payment account. In at least some of these embodiments, upon receiving an authorization response message from the authorization entity, the authorization module 208 may generate a new authorization response message which includes the token in place of the payment account identifier, and transmit that authorization response message to the resource provider from which the authorization request message was received.

In some embodiments, the account identification module 210 may, in conjunction with the processor 204, be configured to identify an account to be used to complete a transaction. In some embodiments, the account identification module 210 may be in communication with a checkout element instantiated on a user device 228. The account identification module 210 may receive, from the checkout element, one or more data retrieved from the user device 228. In some embodiments, the data may include data retrieved from a cookie or other document. In some embodiments, the data may include an identifier for the user device 228 itself, such as a phone number, serial number, international mobile equipment identifier (IMEI), or other suitable identifying information). In some embodiments, the checkout element installed on the user device 228 may cause a facilitator application 234 to be instantiated (e.g., using an application programming interface (API) call), and the data may include information generated by the facilitator application 234. The account identification module 210 may then use the received data to identify an account from user data 212. Additionally, the account identification module 210 may identify a payment account to be used to complete a transaction for the identified account. In some cases, this may involve multiple steps, including identifying a number of payment accounts associated with the identified account, presenting a list of identifiers for those payment accounts to a user (e.g., via a checkout element on a user device 228), and receiving a selection of one of the payment accounts from the user. In some embodiments, the account identification module 210 may select a default payment account to be used in a transaction. Once a payment account has been identified, the account identification module 210 may generate (or select) a token to be used in a transaction, the token being associated with the resource provider, user, and/or payment account. The account identification module 210 may then provide the token to the user device 228 via a checkout element.

The data stored in databases 212 and 214 may be dynamic, static, or some combination of dynamic and static data. In some embodiments, user data 212 may include any information about users. For example, user data 212 may include demographic data, internet search history data, purchase history data, clickstream data, or any other suitable information related to the user. In some embodiments, token data 214 may include information about tokens previously generated for, or assigned to, transactions to be conducted. In some embodiments, token data 214 may be a token vault.

The SRT server 200 may also contain communications interface(s) 222 that enable the SRT server 200 to communicate with a stored database, another computing device or server, one or more remote devices, and/or any other suitable electronic devices. In some embodiments, the communication interface 222 may enable the SRT server 200 to communicate with other electronic devices on a network 224 (e.g., on a private network). The SRT server 200 may also include input/output (I/O) device(s) and/or ports 226, such as for enabling connection with a keyboard, a mouse, a pen, a voice input device, a touch input device, a display, speakers, a printer, etc.

In some embodiments, the network 224 may include any one or a combination of many different types of networks, such as cable networks, the Internet, wireless networks, cellular networks, and other private and/or public networks. While the illustrated example depicts various electronic devices accessing the SRT server 200 over the network 224, the described techniques may equally apply in instances where the electronic devices interact with the SRT server 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The SRT server 200 may be in communication with a number of other electronic devices. For example, the SRT server 200 may be in communication with user devices 228 and/or resource providers 230. Each of the user devices 228 and resource providers 230 may be capable of interacting with the SRT server 200 to receive and/or process a token.

In some embodiments, a user device 228 may include a mobile application 232, which may be a set of computer executable instructions (e.g. an application) which, when executed, causes the user device 228 to present a checkout element via a display of the user device 228. In some embodiments, the checkout element may be embedded within another element and may be configured to provide data to the SRT server 200 and to receive a token in response. For example, the user device 228 may instantiate a checkout element via a browser application (i.e., an example of mobile application 236) which causes the user device 228 to communicate with the SRT server 200. In some embodiments, the user device 228 may also include a facilitator application 234 (e.g., an eWallet mobile application) capable of authenticating a user. In some embodiments, a checkout element, once instantiated on the user device 228, may cause the facilitator application 234 to execute and authenticate the user. For example, the checkout element may present one or more payment options as well as one or more authentication options to a user. Upon selection of an authentication option that involves a particular facilitator application 234, the checkout element may cause the facilitator application 234 to execute using an API call. In this example, the facilitator application 234, when executed, may be provided with details of the transaction and may be caused to authenticate the user of the user device 228. Upon authenticating the user of the user device 228, the facilitator application 234 may provide a certificate of authenticity and/or a user identifier to the checkout element, which may then convey that data to the SRT server 200.

In some embodiments, a resource provider 230 may be any computing device capable of providing authorization request messages to the service provider 200. In some embodiments, the resource provider 230 may be a retailer (e.g., an electronic retailer) or some other resource provider which manages access to one or more resources (goods and/or services). In some embodiments, the resource provider 232 may include, in its memory, one or more modules for conducting a transaction for a resource (transaction module 238). The resource provider 230 may maintain, or host, a website from which a user may purchase one or more resources managed by the resource provider 230.

In some embodiments, the SRT server 200 may maintain an account with respect to one or more user devices 228. It should be noted that an account maintained by the SRT server 200 for the user device 228 may be different from an account maintained by a resource provider 230 for that same user device 228. Each of an SRT server 200 and a resource provider 230 may separately maintain information related to a user in relation to their respective accounts.

Figure 3:
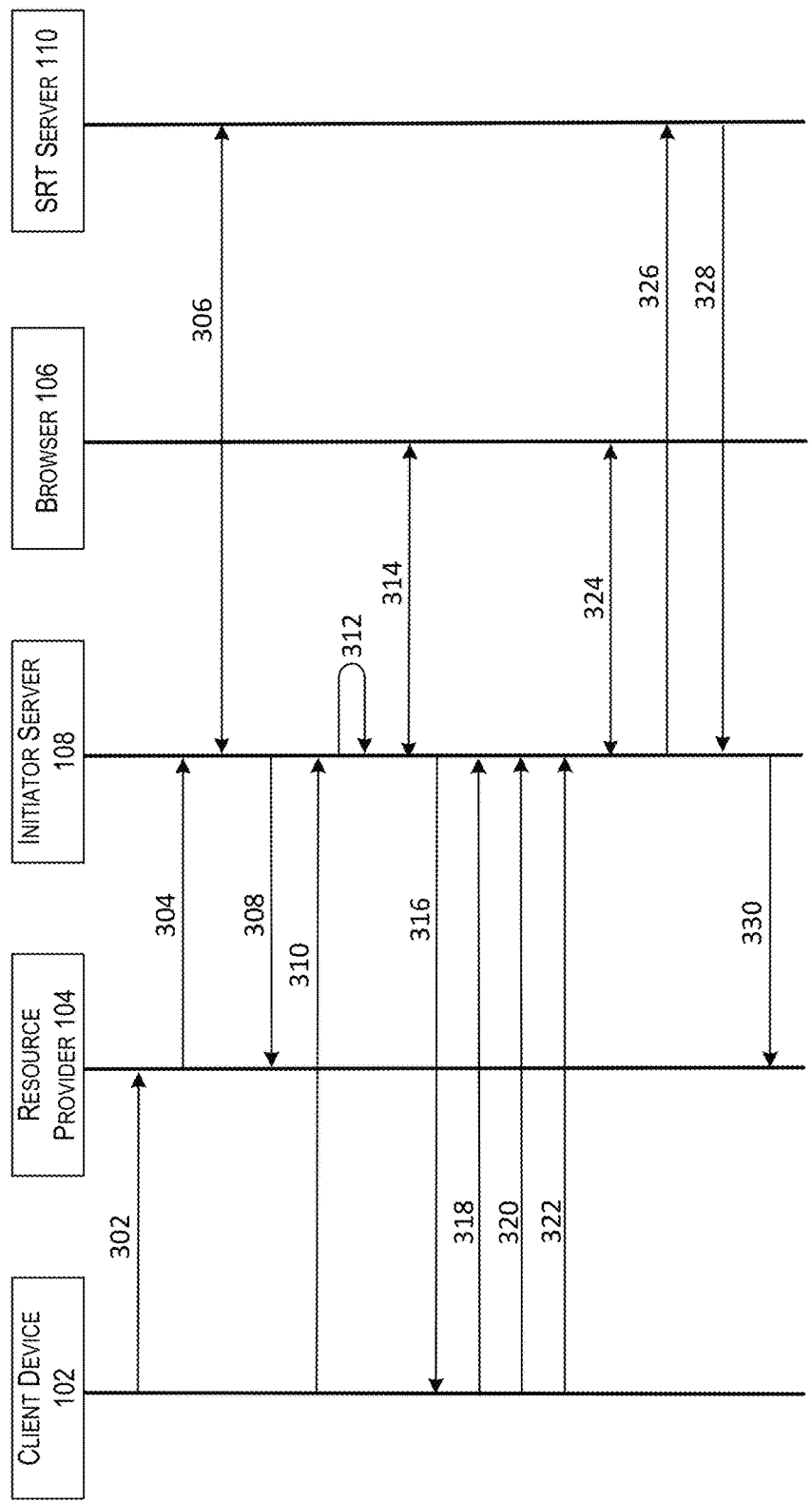
FIG. 3 depicts a swim lane diagram which illustrates an example process for conducting a transaction using a SRT platform in accordance with at least some embodiments.

FIG. 3 depicts a swim lane diagram which illustrates an example process for conducting a transaction using a SRT platform in accordance with at least some embodiments. Depicted in FIG. 3 are interactions between various components as described herein. In particular, the process 300 depicts interactions between a client device 102, a resource provider 104, a browser 106 (installed on the client device 102), an initiator server 108, and a SRT server 110. Each of these components may be examples of the respective components depicted in FIG. 1.

Process 300 may begin at 302, when a user visits a checkout page (e.g., an electronic shopping cart) associated with a resource provider. In some embodiments, the user may select a number of resources (e.g., goods and/or services) provided by an electronic retailer. Once the user has selected a number of resources, the user may select an option to complete a transaction for the resources and may be provided with a checkout page.

On the checkout page, the resource provider may display an embedded checkout element. Upon loading the checkout page, the checkout element may be caused to communicate with the initiator server 108 to initialize payment options at 304. The checkout element may communicate a type and/or format of information needed to the initiator server 108 at this step. Additionally, the resource provider 104 may send information to the initiator server 108 related to a potential transaction. For example, the resource provider 104 may send information related to one or more resources to be obtained by the user as well as a total cost or any other suitable information. In some embodiments, when a user visits a checkout page with an embedded checkout element, the initiator may determine whether or not the user is a recognized user. To do this, the initiator may receive identifier information from the resource provider or from an application (e.g., the checkout element) embedded within the checkout page. In some embodiments, when the user visits a checkout page or selects the checkout element on a resource provider checkout page, that user's email address may be transmitted by the browser 106 (e.g., via a helper feature) to the initiator server. In the scenario in which the initiator server 108 is able to obtain an identifier (e.g., an email address) for the user, the initiator server 108 may transmit that identifier to a number of different SRT servers 110 which support the initiator server 108 at 306.

The SRT servers 110, upon receiving the identifier information, may each determine whether or not an authorization entity associated with the SRT server maintains at least one account associated with that user. In some embodiments, this may involve the SRT server querying a number of authorization servers. In some embodiments, each of the SRT servers 110 may maintain mappings between various accounts and identifiers. In these embodiments, the SRT servers 110 may each query a database that it maintains in order to identify a list of accounts based on the identifier.

Upon identifying a number of accounts, each SRT server 110 may return a list of those accounts, as well as other account details, to the initiator server 108. If the SRT server has not been able to identify any accounts associated with the identifier, then the SRT server may return an indication that the user is not recognized. In some embodiments, the initiator server 108 may provide an indication to the resource provider 104 that the user is recognized at 308.

In the scenario in which the user's email address is unable to be obtained from the browser, the user may be asked to enter his or her email address. The initiator server may then identify that user's accounts from the file including the mapping of the accounts to the user's email address. In some embodiments, if the initiator server is unable to identify an account from the mapping file, then the user may be asked to provide an account identifier. The initiator may perform more or more authentication techniques in order to confirm that the user is actually in possession of a provided email address. For example, in some embodiments, the initiator server may send a one-time password (e.g., a code or pin) to the email address, which the initiator may require that the user provide back. The SRT server may then query the SRT servers in the manner described above to identify a number of accounts available for a user.

At 310, the user may initiate a transaction with the resource provider via the checkout page by selecting a displayed checkout button. It should be noted that some embodiments of the disclosure may not include steps 308 and/or 310. For example, in some embodiments the following steps may be performed automatically (e.g., without generation of, and selection of, a checkout button).

At step 312, the initiator server 108 may populate the checkout element with information about the user. In some embodiments, the checkout element may be a widget or other separate application embedded into a webpage hosted by the resource provider computer 104. In some embodiments, the initiator server 108 may communicate with the browser 106 at 314 to identify at least some portion of data with which to populate the checkout element. For example, the browser may maintain (e.g., in cookies or user settings) information such as shipping information for the user, which may be populated into the checkout element.

Once the initiator server 108 has identified a user and populated the checkout element with a list of accounts associated with that user, the initiator server 108 may provide the populated checkout element to the user at 316. In some embodiments, the client device 102 may be configured to display the populated checkout element. The client device 102 may enable the user to select a specific account from the list of accounts to be used to complete the transaction. The user's selection of a specific account is then provided to the initiator server 108 at 318. The client device 102 may enable the user to select a specific shipping address to be used to complete the transaction at 320. Additionally, the client device 102 may enable the user to select a number of other details to be used to complete the transaction at 322.

Upon receiving the user's selection, the initiator server 108 may initiate an authentication process to verify that the user is authorized to complete the transaction at 324. In some embodiments, the authentication process may be a native CVM process implemented via the browser 106. In some embodiments, the authentication process may be initiated via a facilitator application installed upon the client device 102.

Once authenticated, the initiator server 108 may identify the SRT server associated with the selected account. The initiator server 108 may generate and transmit a request to the appropriate SRT server 110 at 326. In some embodiments, the request may include details of the transaction to be conducted. It should be noted that each account is associated with only one SRT server 110 whereas a single SRT server 110 may be associated with multiple accounts.

Once the request has been received by the SRT server and the user for the transaction has been identified, account information stored by the SRT server 110 may be identified with respect to that user. Once the account information has been identified, the user may be asked to authenticate himself or herself using a separate authentication process. It should be noted that the authentication process 306 may be separate from any login required in a user identification process. In some embodiments, if this is the first time that the user has utilized a particular account with a particular browser application, the user may be required to perform one or more extra steps to confirm his or her identity (e.g., a IDD process). Once this is done, the user's identity may be securely bound to the user's identity within the browser.

In some embodiments, once the SRT server 110 has determined that the user is authenticated, it may generate a token to be used in the requested transaction. This may involve generating a token (e.g., a randomly generated string of characters) which may be mapped to the selected account in a token vault. Once the SRT server 110 has identified any relevant supplemental information to be included in the transaction (e.g., shipping information), the SRT server 110 may provide a token to the initiator server 108 at 328. The initiator server 108 may subsequently complete the transaction and present a confirmation notification. In some embodiments, to do this, the initiator server may provide the token to the resource provider 104 for the resource provider to complete the transaction using the token at 330. In some embodiments, the resource provider 104 may store the token for future use. In some embodiments, the initiator server 108 may generate an authorization request message on behalf of the resource provider, which it may route to the SRT server 110 (e.g., via a transaction processing network).

In some embodiments, the resource provider may complete the transaction by submitting an authorization request message including the token, the transaction amount, and a resource provider ID to the processing network (e.g., processing network 110(C)(1)) via an acquirer computer (not shown). The processing network may determine a real account identifier (e.g., a PAN or primary account number) associated with the token, and may generate a modified authorization request message including the real account identifier to an authorizing entity computer operated by an authorizing entity such as an issuer. The authorizing entity may approve or deny the request, and may generate an authorization response message including the authorization decision. The authorization response message may be transmitted back to the processing network, and the processing network may substitute the token for the real account identifier in the authorization response message. The modified authorization response message may then be transmitted back to the resource provider. At the end of the day or any other suitable period of time, a clearing and settlement process may take place between the acquirer and the authorizing entity, via the processing network.

Figure 4:
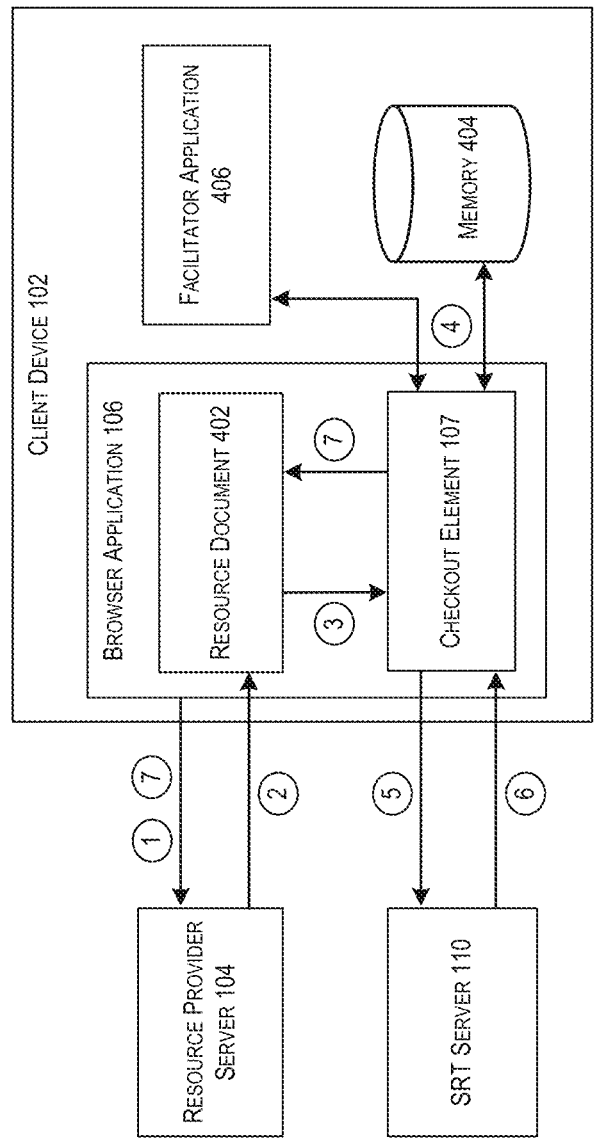
FIG. 4 depicts a block diagram illustrating an example process for conducting a transaction while preserving consumer privacy in accordance with at least some embodiments.

FIG. 4 depicts a block diagram illustrating an example process for conducting a transaction while preserving consumer privacy in accordance with at least some embodiments. The process 400 may be performed by a number of components, including at least a client device 102, a resource provider 404, and an SRT server 110. Each of components client device 102, resource provider 404, and SRT server 110 may be examples of their respective components described with respect to FIG. 1 above.

Process 400 may begin at step 1, when a browser application installed upon a client device 102 is executed and directed to a website operated by a resource provider server 104. In some embodiments, the browser application 106 may request a resource document (e.g., a webpage) 402 related to a particular resource managed by the resource provider. In some embodiments, the browser application 106 may request a resource document 402 related to a checkout page (e.g., an electronic shopping cart) managed by the resource provider.

At step 2, the process 400 may involve, upon receiving the request for the resource document 402 by the resource provider server 104, serving the resource document 402 to the client device 102. The resource document 402 may then be presented via the browser application 402. In some embodiments, the resource document 402 may include a link (or other suitable reference) to a checkout element 107. The resource document may include a number of data and/or populated data fields associated with a transaction to be conducted. For example, the resource document 402 may include data related to an amount of a transaction to be conducted, identifiers for one or more resources to be involved in the transaction, shipping information, etc.

At step 3, the process 400 may involve instantiating a checkout element 107. In some embodiments, the checkout element 107 may be instantiated upon the browser application 106 loading the resource document 402. In some embodiments, the checkout element 107 may be instantiated upon selection of a button or other mechanism located on the resource document 402. For example, the checkout element 107 may be instantiated upon selection of a "checkout" button displayed via the browser application 106 by a user of the client device 102. In some embodiments, data related to a transaction to be conducted may be provided to the checkout element. For example, data related to an amount of a transaction to be conducted, identifiers for one or more resources to be involved in the transaction, shipping information, etc., may be retrieved from the resource document 402 and provided to the checkout element 107.

At step 4, the process 400 may involve identifying information associated with a user. In some embodiments, this may involve retrieving data from a memory 404 of the client device 102. For example, the checkout element 107 may retrieve information stored in a cookie placed in memory of the client device 102. In some embodiments, the information stored in the cookie may include an identifier for the user. It should be noted that an identifier for the user may not be used by another entity to identify the user. For example, the identifier for the user may be a random or pseudo-random string of characters that is associated with the user via a database mapping maintained by the SRT server 110.

In some embodiments, step 4 may involve execution of a facilitator application 406 on the client device 102. In at least some of these embodiments, a user may be presented with a list of facilitator applications 406 available (e.g., installed upon) the client device 102. Upon selection of a particular facilitator application 406, the checkout element 107 may cause that facilitator application to be executed on the client device. This may involve the checkout element 107 interacting with the facilitator application 406 via one or more APIs associated with the facilitator application 406. In some embodiments, the checkout element 107 may provide data related to the transaction to the facilitator application 406. Once executed, the facilitator application 406 may be caused to authenticate the user of the client device 102. Upon authenticating the user of the client device 102, the facilitator application 406 may provide an indication of the user's authenticity and/or an identifier for the user to the checkout element 107.

At step 5, the process 400 may involve the checkout element providing user data to the SRT server 110. As described elsewhere, in some embodiments data may be provided by the checkout element 107 to an initiator application server, such as initiator application server 108 described with respect to FIG. 1. While described with respect to the SRT server 110, it should be noted that at least a portion of the functionality described for process 400 may be performed by an initiator application server. In some embodiments, the user data may include data retrieved from the memory 404 of the client device. In some embodiments, the user data may include an indication of a user's authenticity and/or an identifier for the user generated by a facilitator application 406. The SRT server 110 may identify an account associated with the user based on the provided user data. The SRT server 110 may also identify a payment account to be used in the transaction. In some embodiments, this may involve multiple steps in which the SRT server 110 identifies a number of payment accounts available to the user, provides a list of the number of payment accounts to the checkout element 107, and receives a selection of a payment account from the list of available payment accounts. In this scenario, the checkout element 107 may present the list of available payment accounts to a user (e.g., via a drop-down list) and may provide the user's selection from that list to the SRT server 110. Upon determining a payment account to be used to complete the transaction, the SRT server 110 may generate a token to be associated with the transaction. The data received from the checkout element 107 (including transaction details) and an indication of the payment account may be stored in relation to the token by the SRT server 110.

At step 6, the process 400 may involve the SRT server 110 providing the generated token to the checkout element 107. Once received the checkout element 107 may provide the token to the resource provider server 104 via the resource document at step 7. The resource provider server 104 may then use the provided token to complete a transaction FIG. 5-7 each depict example processes for enabling a transaction to be conducted in accordance with at least embodiments of the disclosure. Each of these processes are depicted as a series of graphical user interface (GUI) elements.

Figure 5:
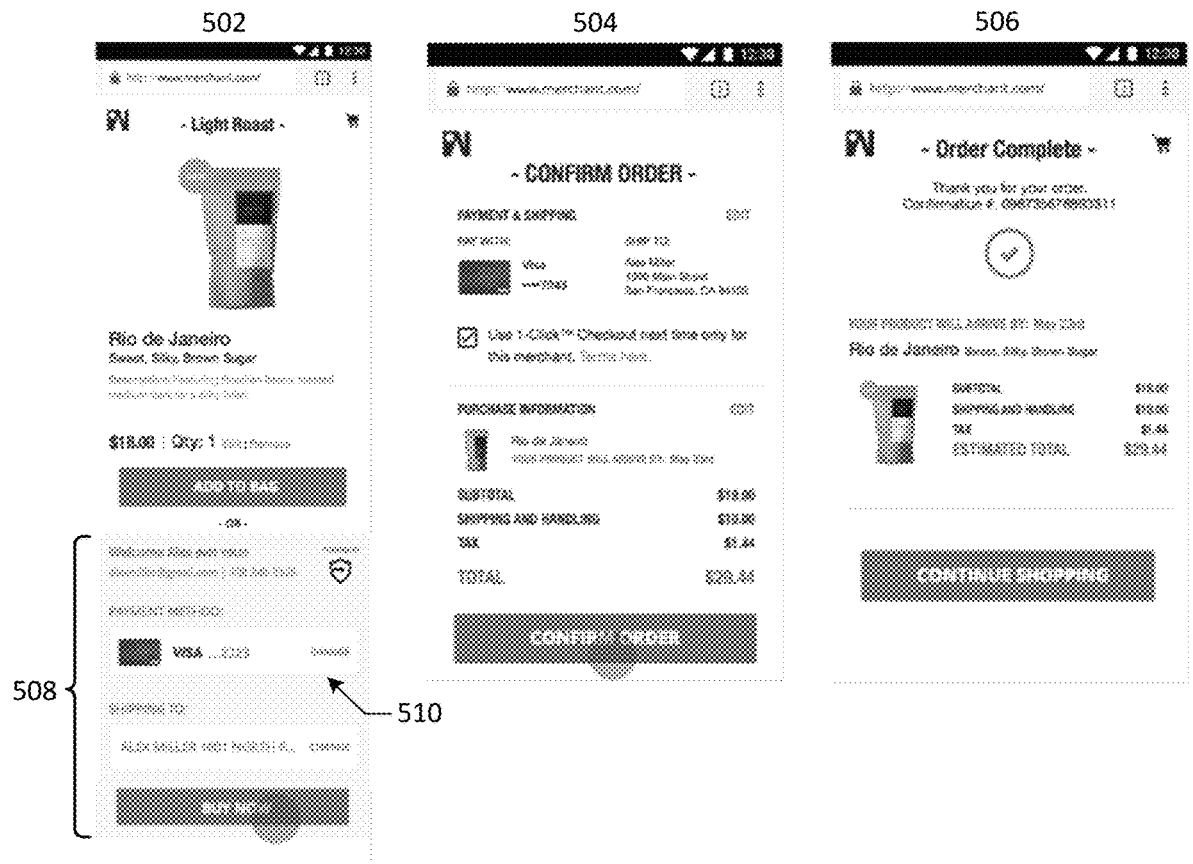
FIG. 5 depicts a first example of a process for enabling a transaction to be conducted in accordance with at least some embodiments of the disclosure.

FIG. 5 depicts a first example of a process for enabling a transaction to be conducted in accordance with at least some embodiments of the disclosure. In FIG. 5, the process 500 is depicted via a series of GUIs that include GUI 502, GUI 504, and GUI 506. In FIG. 5, a checkout element 508 may be embedded within a product website on an electronic retail site. For example, the user may be given the ability to check out with a particular item without the need to add items to a cart and proceed to an actual checkout page.

The checkout element 508 may be populated within a GUI 502 depicting a resource provider's checkout page. Upon loading a website with the checkout element 508, the user may be identified (e.g., based on information stored in a memory of the device on which the checkout element is implemented) and presented an account selection option 510 containing one or more available accounts for that user. As described herein, the user may be identified by an initiator server by querying a number of SRV servers supporting that initiator server based on cookies stored on a client device from which the functionality is accessed.

In some embodiments, the user may be given the ability to confirm the transaction via a confirmation GUI 504. In some embodiments, this may involve presenting a summarization of data to the user. In some embodiments, the user may be given the ability to indicate whether an expedited process should be used to conduct future transactions with the resource provider. For example, if the user indicates that future transactions with the resource provider should be expedited, that resource provider may be given a token that may be used in future transactions. In some embodiments, the token may be resource provider-specific. The user may also be notified of the completion of a transaction via a transaction completion GUI 506.

Figure 6:
FIG. 6 depicts a second example of a process for enabling a transaction to be conducted in accordance with at least some embodiments of the disclosure.
Figure 6:
Figure 6:

FIG. 6 depicts a second example of a process for enabling a transaction to be conducted in accordance with at least some embodiments of the disclosure. FIG. 6 is similar to FIG. 5 described above. However, as depicted via GUIs 602, 604, and 606 of FIG. 6, a checkout element 608 may be embedded within a resource provider's checkout page. Hence, the checkout element 608 may be instantiated upon the checkout page being loaded by a browser application via communication between the browser application and an SRT server. Once instantiated, various fields within the checkout element 608 may be populated with data obtained from a memory of the device on which the browser application is instantiated (e.g., from cookies). The resource provider checkout page and the checkout element 608 may be separated such that data populated into the various fields of the checkout element 608 may not be provided to the resource provider. Instead, as described elsewhere, the checkout element 608 may communicate the data to an SRT server and may receive a token to be used in the transaction. The checkout element 608 may then provide the token to the resource provider (via the checkout page) to be used to complete the transaction.

Figure 7:
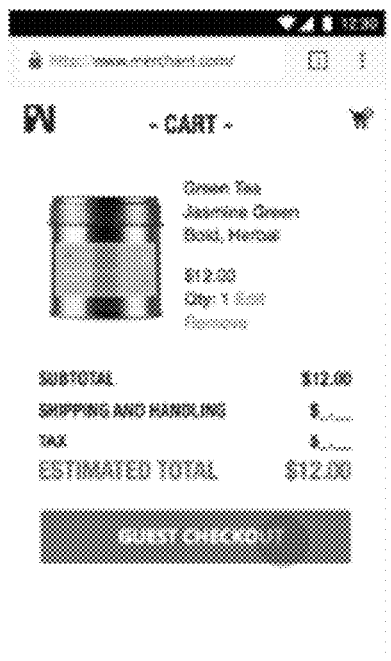
FIG. 7 depicts a third example of a process for enabling a transaction to be conducted in accordance with at least some embodiments of the disclosure.
Figure 7:
Figure 7:
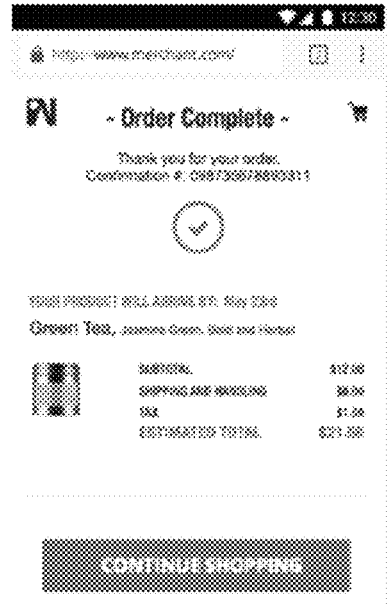

FIG. 7 depicts a third example of a process for enabling a transaction to be conducted in accordance with at least some embodiments of the disclosure. FIG. 7 is similar to FIG. 5 and FIG. 6 described above. However, as depicted via GUIs 702, 704, and 706 of FIG. 7, a checkout element 708 may be presented when the user elects to conduct the transaction in a manner which is anonymous to the resource provider. For example, upon selecting an option to check out as a "guest," the checkout element 708 described above may be populated in accordance with techniques described herein. Once populated, the checkout element may convey the populated values to the SRT server, which may provide a token to be used in the transaction depicted in GUIs 702-700. The checkout element may then pass the token to the resource provider (via the resource provider website) in order to enable completion of the transaction without providing sensitive information to the resource provider.

Figure 8:
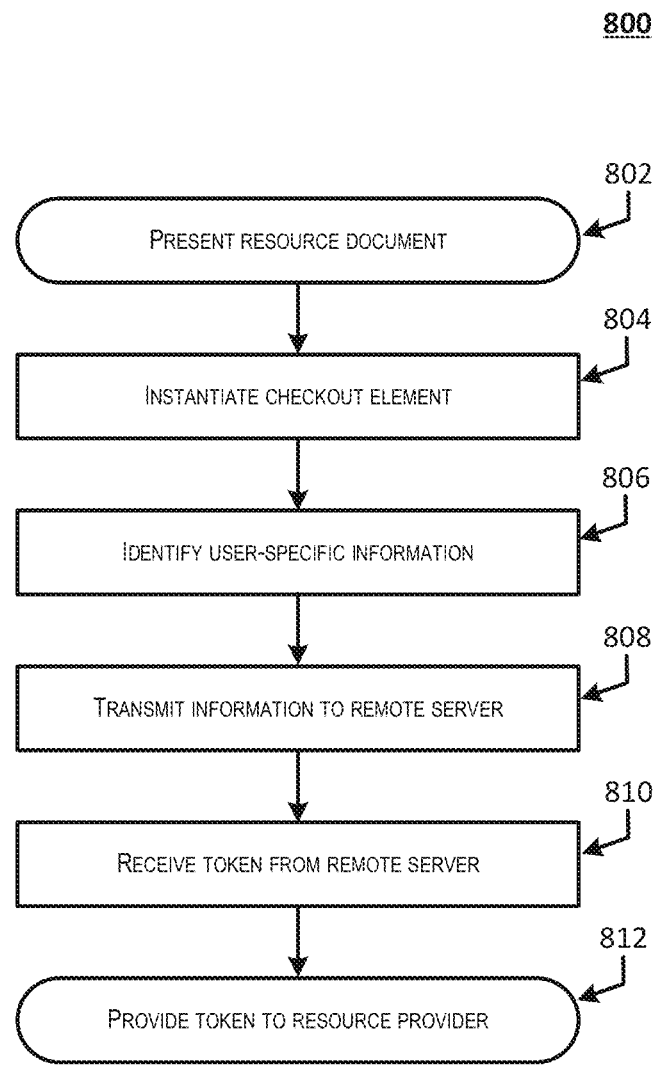
FIG. 8 depicts a flow diagram illustrating an example process for providing a token to a resource provider in a manner that preserves anonymity for a user in accordance with at least some embodiments.

FIG. 8 depicts a flow diagram illustrating an example process for providing a token to a resource provider in a manner that preserves anonymity for a user in accordance with at least some embodiments. The process 800 may be performed on a client device, such as the client device 228 depicted in FIG. 2.

Process 800 may begin at 802, when a resource document is presented on a client device. The resource document may be associated with a resource managed by a resource provider. For example, the resource document may be a webpage hosted by the resource provider with respect to a particular product sold by the resource provider. In some embodiments, the resource document may be a "checkout" webpage hosted by a resource provider, with which a user is able to complete a purchase.

At 804, the process 800 may involve instantiating a checkout element. In some embodiments, the checkout element may be embedded within the resource document. For example, a resource document may include a link or other reference to the checkout element at a particular location within the resource document. When the resource document is loaded by a browser application, the browser application may be caused to retrieve the checkout element via the link and display that checkout element in a specified location within the resource document. It should be noted that though the checkout element may be embedded in the resource document, the resource document may not be granted access to information populated into the checkout element.

At 806, the process 800 may involve identifying, by the checkout element, user-specific information. In some embodiments, this may involve the checkout element obtaining data stored in an internet cookie in the memory of the client device. In some embodiments, the user-specific information may be a random, or pseudo-random, string of characters which is associated with the user at the remote server, but otherwise unassociated with the user. In at least some embodiments, the resource provider may be prevented from accessing the information indicating the identity of the user obtained by the checkout element.

In some embodiments, the user-specific information may be obtained via a facilitator application, such as the facilitator application 406 depicted in FIG. 4. In at least some of these embodiments, the user-specific information may include a authentication decision generated by the facilitator application. In some embodiments, a number of facilitator applications may be installed upon the client device. The checkout element may identify the number of facilitator applications (e.g., via an application discovery process) and provide a list of the number of facilitator applications to a user. A facilitator application may then be selected by a user from the list of the number of facilitator applications installed on the client device. Upon receiving a selection of the facilitator application to be used, the facilitator application may be caused to be launched to authenticate the user, and generate the authentication decision upon authenticating the user. In some embodiments, the checkout element may cause the facilitator application to be launched via an application programming interface. In some embodiments, the remote server, upon being provided an indication of a facilitator application on the client device, may communicate with a facilitator application server to cause it to launch the facilitator application on the client device. In some embodiments, the facilitator application may be provided a number of transaction details upon its launch (e.g., as parameters in a method call). Upon generation of a authentication decision by the facilitator application, that certificate may be provided to the remote server.

At 808, the process 800 may involve transmitting the user-specific information to a remote server. In some embodiments, the remote server may be an initiator application server, such as the initiator application server 108 described with respect to FIG. 1 above. In some embodiments, the remote server may be a secure remote transaction server, such as the SRT server 110(A) described with respect to FIG. 1 above.

Upon receiving the user-specific information, the remote server may identify the user and a payment account associated with the user to be used to complete the transaction. In some embodiments, this may involve the client device receiving, from the remote server via the checkout element, a number of accounts associated with the user, presenting the number of accounts to the user within the checkout element, receiving a selection of a particular account from the number of accounts, and providing the selected account from the number of accounts to the remote server. In some embodiments, the number of accounts associated with the user may be determined by the remote server through communication with a number of processing networks. For example, upon identifying the user based on the provided user identification information, the remote server (which may be an initiator application server) may provide the user's identity to one or more transaction processing networks, which may then identify accounts issued to the user by various issuers and return a list of available payment accounts to the remote server.

At 810, the process 800 may involve the checkout element receiving a token from the remote server. The token may be associated with the identified payment account, user, resource provider, and/or transaction. In some embodiments, the token may be a limited-use token that can only be used to complete the transaction at issue. At 812, the process 800 may involve the checkout element providing the received token to a resource provider to complete the transaction.

Embodiments of the disclosure provide for a number of technical advantages over conventional systems. For example, unlike conventional transaction processing systems, the current disclosure enables a user to conduct transactions with a resource provider while preventing the resource provider from gaining access to sensitive information for the user. Essentially, the user is able to complete a transaction using any account available to that user while being protected from potential risk of unauthorized use of that account. On the other hand, a resource provider is able to ensure that it receives payment for the transaction. This is accomplished via the use of a checkout element that is dynamically populated with user-specific data while that user-specific data is not visible to the resource provider. Hence, embodiments of the disclosure enable a user to conduct transactions securely with a number of entities with which that user does not currently have a relationship.

A computer system may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
presenting, on a browser application executing on a client device, a webpage related to at least one product provided by a resource provider, wherein the webpage is hosted by the resource provider;
embedding a checkout element managed by a secure remote server in the webpage hosted by the resource provider;
instantiating the checkout element upon the browser application loading the webpage related to the at least one product, the instantiating comprising presenting the checkout element including one or more fields embedded in the webpage on the browser application while browsing for the at least one product,
wherein a memory of the client device is accessible by the checkout element managed by the secure remote server, the one or more fields of the checkout element are populated using cookies retrieved from the memory of the client device by the checkout element, the checkout element comprising an application that is separate from the webpage;
identifying, via the checkout element, information indicating an identity of a user of the client device, wherein the resource provider is prevented from accessing the information obtained by the checkout element from the client device, and wherein the information is obtained via an authentication decision, the authentication decision generated by a facilitator application installed on the client device that uses biometric information of the user, the facilitator application obtaining, via an associated voice scanning hardware of the client device or fingerprint scanning sensors of the client device, the biometric information of the user;
transmitting the information indicating the identity of the user to the secure remote server;
receiving, from the secure remote server and via the checkout element, a number of accounts associated with the user, wherein credentials for one of the number of accounts are populated in at least one of the one or more fields of the checkout element;
presenting an option to change the credentials for one of the number of accounts to another one of the number of accounts to the user within the checkout element via the client device;
transmitting a selection of an account from the number of accounts to the secure remote server;
receiving, from the secure remote server and via the checkout element, a token to be used to complete a transaction, the token generated by the secure remote server in response to receiving the selection of the account, the token associated with the account, and the token being specific to the resource provider; and
providing, via the checkout element to the resource provider, the token.

2. The method of claim 1, wherein the number of accounts associated with the user is determined by contacting one or more processing networks.

3. The method of claim 1, wherein the secure remote server is an initiator application server.

4. The method of claim 1, wherein the secure remote server is a secure remote transaction (SRT) server.

5. A client device comprising:
a processor; and
a memory including instructions that, when executed with the processor, cause the client device to, at least:
present, on a browser application executing on a client device, a webpage related to at least one product provided by a resource provider, wherein the webpage is hosted by the resource provider;
embed a checkout element managed by a secure remote server in the webpage hosted by the resource provider;

instantiate the checkout element upon the browser application loading the webpage related to the at least one product, instantiating comprising presenting the checkout element including one or more fields embedded in the webpage on the browser application while browsing for the at least one product,
  wherein a memory of the client device is accessible by the checkout element managed by the secure remote server, the one or more fields of the checkout element are populated using cookies retrieved from the memory of the client device by the checkout element, the checkout element comprising an application that is separate from the webpage;
identify, via the checkout element, information indicating an identity of a user of the client device, wherein the resource provider is prevented from accessing the information obtained by the checkout element, and wherein the information is obtained via an authentication decision from the client device, the authentication decision generated by a facilitator application installed on the client device that uses biometric information of the user, the facilitator application obtaining, via an associated voice scanning hardware of the client device or fingerprint scanning sensors of the client device, the biometric information of the user;
transmit the information indicating the identity of the user to the secure remote server;
receive, from the secure remote server and via the checkout element, a number of accounts associated with the user, wherein credentials for one of the number of accounts are populated in at least one of the one or more fields of the checkout element;
present an option to change the credentials for one of the number of accounts to another one of the number of the accounts to the user within the checkout element;
transmit a selection of an account from the number of accounts to the secure remote server;
receive, from the secure remote server and via the checkout element, a token to be used to complete a transaction, the token generated by the secure remote server in response to receiving the selection of the account, the token associated with the account, and the token being specific to the resource provider; and
provide, via the checkout element to the resource provider, the token.

6. The client device of claim 5, wherein the facilitator application is selected by the user from a number of facilitator applications installed on the client device.

7. The client device of claim 5, wherein the instructions further cause the client device to:
launch the facilitator application to authenticate the user; and
generate the authentication decision upon authenticating the user.

8. The client device of claim 7, wherein the facilitator application is provided a number of transaction details upon its launch.

9. The client device of claim 5, wherein the facilitator application is launched via an application programming interface associated with the facilitator application.

10. The client device of claim 5, wherein the token is a limited-use token that can only be used to complete the transaction.

* * * * *